United States Patent [19]

Koyama et al.

[11]  4,119,986
[45]  Oct. 10, 1978

[54] CONTROL DEVICE OF A SHUTTER FOR A CAMERA

[75] Inventors: Mitsuo Koyama; Ichiro Nemoto; Eiichi Onda; Tadashi Nakagawa; Masanori Watanabe, all of Yotsukaido, Japan

[73] Assignee: Seiko Koki Kabushiki Kaisha, Japan

[21] Appl. No.: 744,925

[22] Filed: Nov. 24, 1976

[30] Foreign Application Priority Data

Nov. 25, 1975 [JP] Japan .......................... 50/159495[U]

[51] Int. Cl.² ............................................. G03B 9/58
[52] U.S. Cl. .................................................... 354/258
[58] Field of Search ......................... 354/258, 234, 235

[56] References Cited
U.S. PATENT DOCUMENTS

| | | | |
|---|---|---|---|
| 3,526,455 | 9/1970 | Barnette | 354/234 X |
| 3,595,152 | 6/1971 | Douglas | 354/258 X |
| 3,820,131 | 6/1974 | Tanaka | 354/258 X |

Primary Examiner—Donald A. Griffin
Attorney, Agent, or Firm—Robert E. Burns; Emmanuel J. Lobato; Bruce L. Adams

[57] ABSTRACT

A control device of the shutter for a camera, which is equipped with shutter blades opening and closing an opening for the exposing operation. A control member actuated by the operation of shutter release and starting an opening member begins the exposing operation at the end of said operation, and an electromagnet connected to an electronic delaying circuit adjusts the time of finishing exposure. A magnetic control lever having a magnetic portion opposing said electromagnet and formed with synthetic resin, and a spring exerting a force for separating said magnetic portion of said magnetic control lever from said electromagnet, is constructed such that a flexible portion which presses said magnetic portion on the attracting face of said electromagnet against said spring is formed of synthetic resin on the engaging portion of at least one of said magnetic control lever and said control member.

6 Claims, 2 Drawing Figures

CONTROL DEVICE OF A SHUTTER FOR A CAMERA

BACKGROUND OF THE INVENTION

This invention is concerned with a control device of a camera shutter.

Almost all the electronic shutters employed at present are those in which the signal for finishing exposure is transmitted from an electronic circuit to an electromagnet, and by demagnetizing said electromagnet, the member for causing finishing of exposure is allowed to operate or run.

In the shutter of this type, it is required to keep said operating or running member attracted and held by said electromagnet at the position capable of being attracted while said electromagnet is excited. As the batteries employed are small in the shutter for small cameras, the holding power of said electromagnet is small, and accordingly it is required to bring said running member in close contact with the attracting face of said electromagnet before excitation. In order to maintain this state of close contact without failure during repeated operation it is useful to maintain said state by pressing elastically, taking account of eventual changes due to a dimensional error in manufacture and other factors, and various means have been proposed for this purpose.

However, the method proposed heretofore was that of mutually connecting the elastic part such as a spring equipped separately and the running part for finishing exposure, resulting in a troublesome arrangement of parts and a rise of production cost. Accordingly, in order to apply such method to a cheap small shutter, some improvements therein are required.

SUMMARY OF THE INVENTION

This invention aims at offering a device applicable to cheap small shutters in view of what is described above. According to this invention, a running member attracted and held by an electomagnet is formed integrally of synthetic resin, including a flexible portion. Also at the position of shutter setting, when said running member attracted and held by said electromagnet is pressed to said electromagnet against a spring, said flexible portion deforms elastically and sucures said state of attraction and holding.

DETAILED DESCRIPTION OF THE INVENTION

Figure 1:
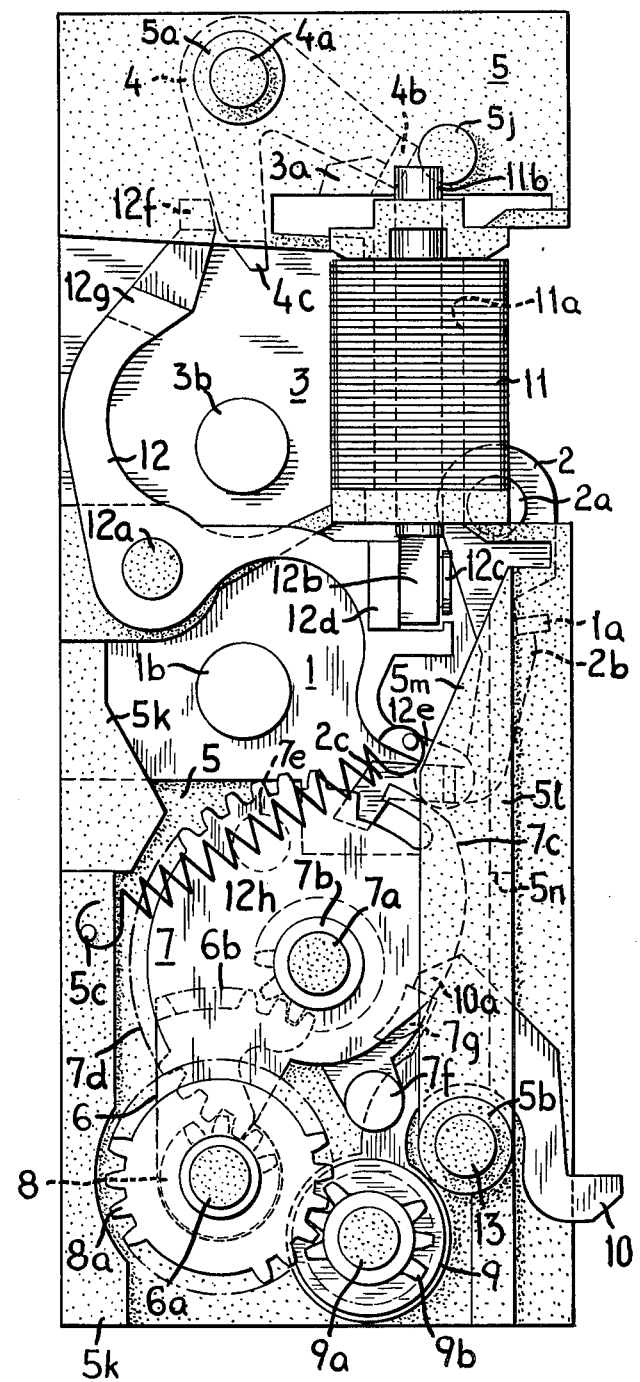
FIG. 1 is a plan of the shutter control device according to the present invention showing the state of shutter charging.

In FIG. 1., an opening blade which starts exposure and a closing blade which ends exposure are pivoted on a first base plate equipped with an opening for exposing films, but they were omitted for simplification of the drawing. As to an opening member 1 for actuating said opening blade, only a bent portion 1a is shown partially, and it is supported with an axis 1b on said base so that it can rotate, and a right-turning spring, which is not shown in the figure, exerts force thereon.

A hook member 2 for said opening member 1, which locks said bent part 1a of said opening member at the shown charging position, is supported with an axis 2a on said base plate so that it can rotate, and a hook portion 2b engages with said bent part 1a. It has an operating arm 2c extending toward the lower left side, and a left-turning spring, which is not shown in the FIGURE, exerts force thereon.

As to a closing member 3 for actuating said closing blade, only a locking arm 3a is shown partially, and it is supported with an axis 3b on said base plate so that it can rotate. Said right-turning spring, which is not shown in the figure, exerts force thereon. A hook member 4 for said closing member, which locks said arm 3a of said closing member at the shown charging position, is supported with an axis 4a on said base plate so that it can rotate. It has an operating arm 4c extending downward, a bent part 4b thereof engages with said arm 3a, and said right-turning spring, which is not shown in the figure, exerts force thereon.

In said hook members for said opening and closing members supported on said base plate and in a second base plate, 5 which supports a control mechanism for actuating said opening and closing blades by controlling said hook member for said closing member, various supporting axes and planes of various parts for the members described in detail hereinafter are formed integrally of synthetic resin.

A cocking gear 6 is from an axis 6a protruding on said second base plate 5, and is turned to the left around said axis 6a by a well-known method, which is not shown in the figure, in connection with the charging operation. A gear 6b is formed on the upper periphery of said cocking gear 6, and engages with a pinion 7b formed integrally of a controlling cam 7. Said controlling cam 7 is supported by an axis 7a protruding from said second base plate, and is equipped with a cam 7c on the right periphery wherein the end thereof is flexible, a gear 7d on the left periphery, a circular downward projection 7e formed on the upper part, a release projection 7f formed on the lower part, and a locking step 7g extending downward. A left-turning spring, which is not shown in the figure, exerts force thereon. An intermediate gear 8 engages with said gear 7d of said controlling cam 7. It is connected to a gear 8a at the periphery thereof and mounted on said axis 6a. A fly wheel 9 is supported by an axis 9a protruding on said second base plate, and connected to a pinion 9b engaging with said gear 8a.

A release lever 10 is on an axis 9a, and a hook portion 10a engages with said locking step 7g of said controlling cam 7. A left-turning spring, which is not shown in the figure, exerts force thereon.

A coil 11 is connected to an electronic circuit, which is not shown in the figure, and is wounded on a frame 11a formed on said second base plate. An iron core 11b which can be magnetized is fixed in said frame.

A magnetic control lever 12 is supported by an axis 12a protruding on said second base plate, and a magnetic portion 12b opposing to said iron core 11b is connected to a projection 12d by a pin 12c. The end of a pressing arm 12e extending toward the lower right side is in contact with said cam 7c of said controlling cam 7, and presses said magnetic portion 12b on said iron core 11b. Also an operating arm 12f extending upward engages with said operating arm 4c of said hook member 4 for said closing member, and operates with a stepped portion 12g in a plane different from that of said pressing arm 12e. Moreover, said magnetic control lever 12 is formed integrally with both arms synthetic resin, and said right-turning spring 12h exerts force on said arm 12e.

Said second base plate 5 is connected and fixed to said first base plate by a pipe 5a inserted on said axis 4a and a pipe 5b inserted on a column 13 mounted on said first base plate. A projection 5c which secures one end of said spring 12h of said magnetic control lever 12 is provided at the lower left portion, and a projection 5j which supports said iron core 11 is provided at the upper right portion. A side wall 5k on the left side and side walls 5l and 5m on the lower right portion are arranged as a reinforcement of said second base plate and a wall for preventing the scattering of lubricating oil.

Figure 2:
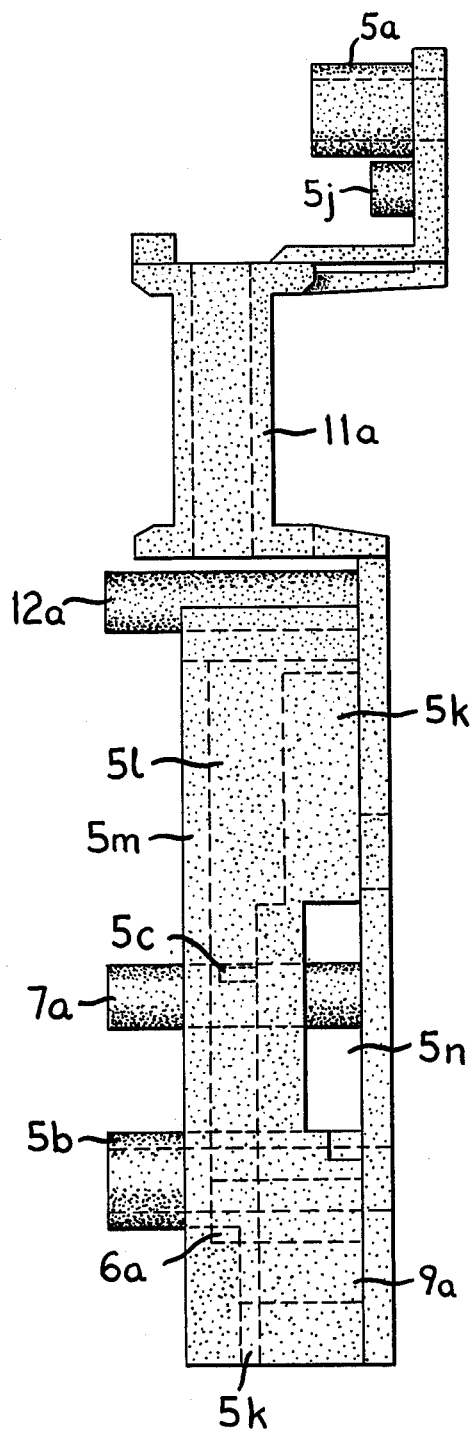
FIG. 2 is a partial view of the right side of the shutter control device shown in FIG. 1.

In said side wall 5l, a hole 5n for said release lever 10 is made. In order to illustrate the structure of said second base plate, FIG. 2 shows the right side view of said second base plate shown in FIG. 1. Hereinafter, the operating mode of the present invention is explained.

From the state shown in FIG. 1, in connection with the release of a camera shutter, said release lever 10 is turned to the right against a spring, a hook portion 10a releases the engagement with said locking step 7g, and said controlling cam 7 is set in motion. Generally, supply of power to an electronic circuit is started before said controlling cam 7 has been set in motion, and current flows to said coil 11, said iron core 11b is magnetized, and said magnetic portion 12b is maintained in attracted and held state. Said controlling cam 7 turns to the left by a spring which is not shown in the figure, said pinion 7b engages with said gear 6b of said cooking gear 6, said gear 7d engages with said gear 8, further, and said gear 8a engages with said gear 9b. Consequently said cocking gear 6 and said fly wheel 9 are rotated simultaneously, and owing to this, said controlling cam 7 is turned falling behind.

By the action of said controlling cam 7, said cam 7c disengages from pressing contact with said pressing arm 12e of said magnetic control lever 12 and releases the same, and said projection 7e operates the starting contact for time control (which is not shown in the figure) in said electronic circuit.

The pressing contact of the arm 12e is released, but as said magnetic portion 12b is attracted and held by said iron core 11b, said magnetic control lever maintains the state shown in FIG. 1.

At the end of operation of said controlling cam 7, said release projection 7f engages with said operating arm 2c of said hook member 2 for said opening member and turns said hook member 2 for said opening member to the right, for releasing the engagement of said hook portion 2b and said bent portion 1a is released.

As the locking of said bent portion 1a is released, said opening member 1 turns to the right around said axis 1b by a spring which is not shown in the figure, and actuates an opening blade which is not shown in the figure. Consequently exposure is started.

After a desirable time has elapsed, the energization of said coil 11 is shut off by said electronic circuit, and said iron core 11b is demagnetized. Consequently, magnetic force attracting said magnetic portion 12b is terminated, and said magnetic control lever 12 turns right due to a spring 12h. Said pressing arm 12e of said magnetic control lever 12 can turn to the right as said cam 7c retracts, and the control lever 12 pushes said operating arm 4c of said hook member 4 for said closing member with said operating arm 12f. Thus, the engagement of said bent portion 4c and said arm 3a is released.

As the locking of said arm 3a is released, said closing member 3 turns to the right due to a spring which is not shown in the figure around said axis 3b, and actuates a closing blade which is not shown in the figure. Thus the exposure is completed.

In order to charge the shutter again, said opening member 1 and said closing member 3 are turned to the left against the respective springs thereof with a setting lever which is not shown in the figure by a well-known method. Subsequently, said bent portion 1a is engaged with said hook portion 2b of said hook member 2 for said opening member, and said arm 3a is engaged with said bent portion 4a b of said hook member 4 for said closing member. At the same time, said cocking gear 6 is turned to the left against a spring of said controlling cam 7, and said locking step 7g of said controlling cam 7 is engaged with said hook portion 10a of said release lever 10. Thus, various member are shifted to the state shown in FIG. 1., and charging is completed.

Moreover, in the embodiment, said pressing arm 12e is a flexible extension from the magnetic portion 12b, and the spring 12h acts thereon. This structure minimizes error of the pressing action caused by nonuniformity in the relative positions of said controlling cam 7 and said iron core 11b. However, if attention is paid to these relative positions, it is possible to form said pressing arm 12e flexibly around said axis 12a and make it flexible between said axis 12a and projection 12d and also to shift the acting position of said spring 12h to the other portion than said flexible portion of said pressing arm. Also said flexible portion may be provided in only one of either said magnetic control lever or said controlling cam.

As understood clearly from the explanation described above, said flexible pressing arm 12e formed integrally with said magnetic control lever 12 is brought in pressing contact with said iron core 11b said controlling cam 7 against said spring 12h of said magnetic control lever 12, and any other member is not equipped. In addition, the cooperative action is extremely simple, therefore it is possible to offer a small shutter, the production cost of which is low and the operational stability and reliability of which are excellent.

We claim:

1. A control device of a camera shutter, comprising: opening and closing members for respectively effecting opening and closing of a shutter aperture; a magnetic control lever for controlling operation of said closing member; a control member for controlling operation of said opening member and operation of said magnetic control lever; a spring for urging said magnetic control lever towards an operative position in which said closing member is operated; and an electromagnetic, said magnetic control lever having a magnetic portion which, when said electromagnet is energized, is attracted thereto so that said magnetic control lever is held thereby in an inoperative position; said magnetic control lever and/or said control member having a respective integral flexible portion which, when the control device of the camera shutter is charged, urges said magnetic portion into contact with said electromagnet.

2. A control device as described in claim 1, wherein said flexible portion is on said magnetic control lever and is effective for applying a spring force in the direction for separating said magnetic control lever from said electromagnet.

3. A control device as described in claim 2, wherein said spring is displaced by the deflection of said flexible portion when said magnetic control lever is in its inoperative position.

4. In a camera shutter control device: a shutter opening member positionable from a first position corresponding to a closed shutter condition to a second position corresponding to an open shutter condition; a shutter closing member positionable from a first position corresponding to an open shutter condition to a second position corresponding to a closed shutter condition; a control lever having a free end and mounted to pivot between an inoperative position with said free end disengaged from said shutter closing member and an operative position with said free end effective for positioning said shutter closing member from its first to its second position to effect shutter closure, said control lever including a magnetizable portion; a spring connected to said control lever for biasing said control lever toward the operative position of said control lever; an electromagnet positioned proximate said magnetizable portion of said control lever when said lever is in the inoperative position and energizable to develop a magnetic field for holding said control lever in the inoperative position against the biasing action of said spring; a control cam positionable between a set position and a released position, said control cam having actuating means for actuating said shutter opening member to travel from its first to its second position as said control cam travels from the set position to the released position, said control cam having a portion dimensioned to contact a corresponding portion of said control lever for holding said control lever in its inoperative position against the biasing action of said spring when said control cam is in its set position, said portion of said control cam being dimensioned to clear said corresponding portion of said control lever and release said control lever from its inoperative position after actuating said shutter opening member as said control cam travels from its set to its released position, and said portion of said control cam and said corresponding portion of said control lever jointly comprising resilient holding means for resiliently holding said control lever in its inoperative position.

5. In a camera shutter control device according to claim 4, wherein said resilient holding means includes: a resilient arm portion extending from said control lever and bearing against said portion of said control cam when said control cam is in its set position for resiliently holding said control lever in its inoperative position.

6. In a camera shutter control device according to claim 4, wherein said resilient holding means includes: a resilient extension from said control cam and bearing against said corresponding portion of said control lever when said control cam is in its set position for resiliently holding said control lever in its inoperative position.

* * * * *